(No Model.)
L. F. WOOD.
AERATOR FOR MILK OR OTHER LIQUIDS.
No. 448,568. Patented Mar. 17, 1891.
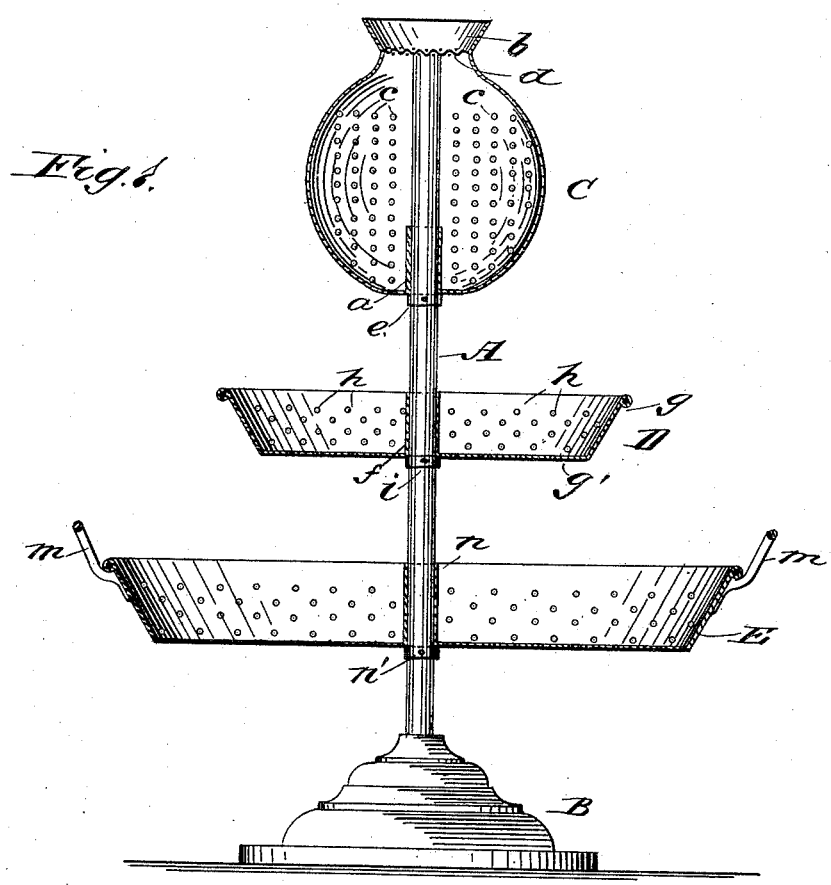
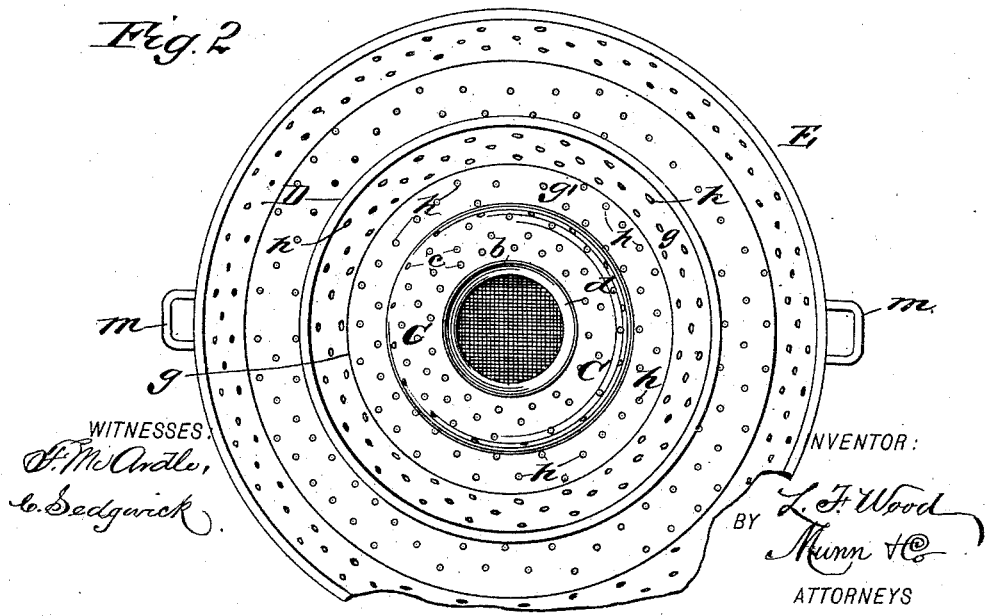

UNITED STATES PATENT OFFICE.

LIZZIE FLORENCE WOOD, OF WEST LEBANON, NEW HAMPSHIRE.

AERATOR FOR MILK OR OTHER LIQUIDS.

SPECIFICATION forming part of Letters Patent No. 448,568, dated March 17, 1891.

Application filed November 14, 1890. Serial No. 371,421. (No model.)

*To all whom it may concern:*

Be it known that I, LIZZIE FLORENCE WOOD, of West Lebanon, in the county of Grafton and State of New Hampshire, have invented a new and useful Aerator for Milk and other Liquids, of which the following is a full, clear, and exact description.

The object of this invention is to provide a convenient portable device for the aeration of milk that is warm and fresh, to facilitate cooling of the liquid, and cause a rapid separation of the cream.

To this end my invention consists in the construction and combination of parts, as hereinafter described and claimed.

Reference is to be made to the accompanying drawings, forming a portion of this specification, in which similar letters of reference indicate corresponding parts in both of the figures.

Figure 1 is a vertical axial section of the device; and Fig. 2 is a plain view, broken, of the aerator.

It is intended that the utensil shall be made of such dimensions that it may be conveniently carried and located at any point convenient for its service, such as in a cold room where pure air circulates.

The preferred form for the aerator consists, as shown, of an upright standard A, which may be tubular and made of sheet metal, or be constructed as a solid cylindrical rod. Upon the lower end of the standard A the heavy base-block B is secured, the standard extending vertically therefrom when the block rests on a horizontal surface. Near the upper end of the standard A the spraying-chamber C is located thereon. Said chamber is preferably made spherical in form, having an axially-located sleeve $a$, upwardly projected from the flattened lower wall of the sphere, the open top of the chamber being flared outwardly and upwardly to afford a funnel-shaped inlet-aperture $b$ for the chamber C.

Numerous fine evenly-spaced perforations $c$ are formed in the wall of the spherical chamber C, commencing at a proper point below the top $b$ and extending through the entire surface below, thereby converting the foraminated chamber into a spraying-vessel, from which liquid will project in a multitude of fine streams when introduced therein.

Upon the inner surface of the funnel-shaped border-wall of the inlet-aperture $b$ a circular diaphragm $d$ is loosely located, which is either made of a perforated plate, or, as shown, constructed of a wire-cloth of a proper mesh, which will arrest any impurities that may be in the milk when it is poured into the chamber C.

The spraying-chamber C should for convenience in stowage and to facilitate cleansing of the same be made removable from the standard and capable of an adjustment for height thereon. This may be effected by an adjustable collar $e$ or any other equally simple and efficient means.

At a proper distance below the spraying-chamber C a circular dished receptacle or pan D is placed. Said pan, having a flat bottom and flaring side wall, is furnished with an axially-located sleeve $f$, that penetrates the bottom wall and is secured thereto, thus affording a sliding connection for the pan upon the standard A. The side wall $g$ of the pan D is foraminated from a point at a proper distance from its top edge, and perforations of a similar size are made at closely-spaced intervals throughout the bottom wall $g'$, as at $h$. A movable collar $i$ is provided to sustain the pan D at any point of elevation on the standard A, so as to adapt said pan to catch the sprays of liquid thrown out of the chamber C by the force of gravity, the diameter of the pan being so relatively proportioned that none of the streams issuing from the chamber will project beyond the pan.

Between the pan D and the base-block B a second pan E of like form is located upon the standard A, its diameter being increased in proportion to that of the pan D, so as to adapt it to catch all the streams of milk and cream mixed therewith, which will issue from the perforations in the side and bottom walls of said pan, the lower pan E having like perforations to discharge its contents received from above, as indicated.

Two opposite handles $m$ are attached to the side wall of the pan E near its upper edge for convenience in portage of the entire device, and the desired height for the lower pan may be maintained by the provision of an extension $n'$ on either end of the sleeve $n$, that is secured centrally in the bottom of the pan and projects vertically within the same, as shown in Fig. 1, said extension $n'$ being detachably connected to the standard A by a cross-pin or other means.

For use the device in complete form is placed in any receptacle of sufficent area to insure the arrest within its borders of all the liquid discharged through the perforations of the lower pan E. Now milk, if poured in the chamber C, will be successively discharged in multitudinous small streams from the chamber and the pans below it, and by its intimate subdivision thus effected will be thoroughly aerated and the beneficial results pertaining to such an operation secured in an obvious manner.

From the simple form of construction and convenience of manufacture out of inexpensive material a useful aerator is afforded, which may be used for other purposes, such as cooling and straining sirups, or the aging of liquors by their passage through the device and consequent oxygenation.

Having fully described my invention, I claim as new and desire to secure by Letters Patent—

1. The combination, with a standard vertical on a base, a spheroidal foraminated chamber on the standard, and a screen in the open top of said chamber, of a foraminated pan below the spheroidal chamber and adjustable on the standard, substantially as set forth.

2. The combination, with a standard, a heavy base on which the standard is vertically secured, a spheroidal foraminated chamber on the standard near its top, and a screen in the flaring inlet-aperture of the chamber, of a circular foraminated pan below the chamber on the standard, substantially as set forth.

3. The combination, with a standard upright on a base, a heavy base-block, a spheroidal chamber having an open top guarded by a flaring wall and foraminated laterally and downwardly, and a flat screen which loosely engages the inner side of the flaring guard-wall, of a foraminated dished pan adjustable on the standard below the spheroidal chamber, and a larger foraminated pan having handles opposite on its side wall and adjustably secured on the standard between the upper pan and the base-block, substantially as set forth.

LIZZIE FLORENCE WOOD.

Witnesses:
HENRY T. DUNBAR,
JOHN H. STARR.